(12) United States Patent
Takeuchi

(10) Patent No.: US 9,219,853 B2
(45) Date of Patent: Dec. 22, 2015

(54) FOCUS DETECTION APPARATUS, IMAGE PICKUP APPARATUS, AND FOCUS DETECTION METHOD

(71) Applicant: CANON KABUSHIKI KAISHA, Tokyo (JP)

(72) Inventor: Kengo Takeuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/081,459

(22) Filed: Nov. 15, 2013

(65) Prior Publication Data

US 2014/0146220 A1  May 29, 2014

(30) Foreign Application Priority Data

Nov. 26, 2012  (JP) ................. 2012-257035

(51) Int. Cl.
*H04N 5/232* (2006.01)
*H04N 5/359* (2011.01)

(52) U.S. Cl.
CPC ............ *H04N 5/23212* (2013.01); *H04N 5/359* (2013.01)

(58) Field of Classification Search
None
See application file for complete search history.

(56) References Cited

U.S. PATENT DOCUMENTS 4,410,804 A  10/1983  Stauffer

FOREIGN PATENT DOCUMENTS

JP  58-024105 A  2/1983
JP  2005-106994 A  4/2005

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

A focus detection apparatus includes an image pickup element including first and second pixels that detect light beams passing through different exit pupils in an image pickup optical system, an estimating unit that estimates a moving charge amount between the first and second pixels using first and second luminance signals, a correcting unit that corrects the first and second luminance signals based on an estimation result, a defocus amount calculating unit that obtains a defocus amount by using correction values of the first and second luminance signals, and a focus detecting unit that performs focus detection of a phase difference method using the defocus amount, and the moving charge amount is a charge amount which moves from one to the other of the first and second pixels as a charge amount accumulated in the one of the pixels comes close to a saturated charge amount.

9 Claims, 5 Drawing Sheets

FOCUS DETECTION APPARATUS, IMAGE PICKUP APPARATUS, AND FOCUS DETECTION METHOD

BACKGROUND OF THE INVENTION

1. Field of the Invention

The present invention relates a focus detection apparatus used in an image pickup apparatus such as a digital camera or a video camera.

2. Description of the Related Art

Japanese Patent Laid-open No. S58-24105 discloses a focus detection apparatus which performs focus detection of a pupil division method by using a two dimensional image sensor (an image pickup element) in which a micro lens is formed for each pixel. In the focus detection apparatus disclosed in Japanese Patent Laid-open No. S58-24105, a photoelectric converter of each pixel constituting the image sensor is divided into a plurality of photoelectric conversion portions, and the divided photoelectric conversion portions receive light beams passing through different regions from each other in a pupil of an imaging optical system via one micro lens.

Japanese Patent Laid-open No. 2005-106994 discloses an image pickup apparatus which performs focus detection of a pupil division method by using a CMOS sensor as an image pickup element. In the image pickup apparatus disclosed in Japanese Patent Laid-open No. 2005-106994, a portion of pixels among a plurality of pixels which constitute the CMOS sensor include divided photoelectric conversion portions in order to detect a focus state of an image pickup optical system (an imaging optical system). The divided photoelectric conversion portions receive light beams passing through different regions from each other in a pupil of an image pickup lens via one micro lens.

In conventional arts, an added signal of a plurality of pixels sharing one micro lens is used as an image signal. By configuring so that a charge can move between the plurality of pixels, deterioration in image quality due to charge saturation can be reduced. However, when performing focus detection by using pixel signals of a plurality of pixels, it is difficult to obtain an accurate focus detection result because a charge moves between a plurality of pixels in a case where incident light amount is large (in a high luminance state). That is, if a charge movement (a charge transfer) occurs, a phase difference which is smaller than a phase difference ought to be observed is detected. Therefore, a focus detection error is large, which leads to deterioration in focus accuracy and delay in focusing operation.

BRIEF SUMMARY OF THE INVENTION

The present invention provides a focus detection apparatus, an image pickup apparatus, and a focus detection method capable of reducing a focus detection error when an incident light amount is high (in a high luminance state).

A focus detection apparatus as one aspect of the present invention includes an image pickup element including a first pixel and a second pixel configured to detect light beams passing through different exit pupils in an image pickup optical system, an estimating unit configured to estimate a moving charge amount between the first pixel and the second pixel by using a first luminance signal obtained in the first pixel and a second luminance signal obtained in the second pixel, a correcting unit configured to correct the first luminance signal and the second luminance signal based on an estimation result obtained in the estimating unit, a defocus amount calculating unit configured to obtain a defocus amount by using a correction value of the first luminance signal and a correction value of the second luminance signal, and a focus detecting unit configured to perform focus detection of a phase difference method by using the defocus amount, and the moving charge amount is a charge amount which moves from one of the first pixel and the second pixel to the other of the first pixel and the second pixel as a charge amount accumulated in the one of the first pixel and the second pixel comes close to a saturated charge amount.

An image pickup apparatus as another aspect of the present invention includes the focus detection apparatus.

A focus detection method as another aspect of the present invention is a method of performing focus detection of a phase difference method by using an image pickup element including a first pixel and a second pixel configured to detect light beams passing through different exit pupils in an image pickup optical system, the focus detection method includes the steps of estimating a moving charge amount between the first pixel and the second pixel by using a first luminance signal obtained in the first pixel and a second luminance signal obtained in the second pixel, correcting the first luminance signal and the second luminance signal based on an estimation result obtained in the estimating step, obtaining a defocus amount by using a correction value of the first luminance signal and the second luminance signal, and performing the focus detection of the phase difference method by using the defocus amount, and the moving charge amount is a charge amount which moves from one of the first pixel and the second pixel to the other of the first pixel and the second pixel as a charge amount accumulated in the one of the first pixel and the second pixel comes close to a saturated charge amount.

Further features and aspects of the present invention will become apparent from the following description of exemplary embodiments with reference to the attached drawings.

DETAILED DESCRIPTION OF THE PREFERRED EMBODIMENTS

Figure 1:
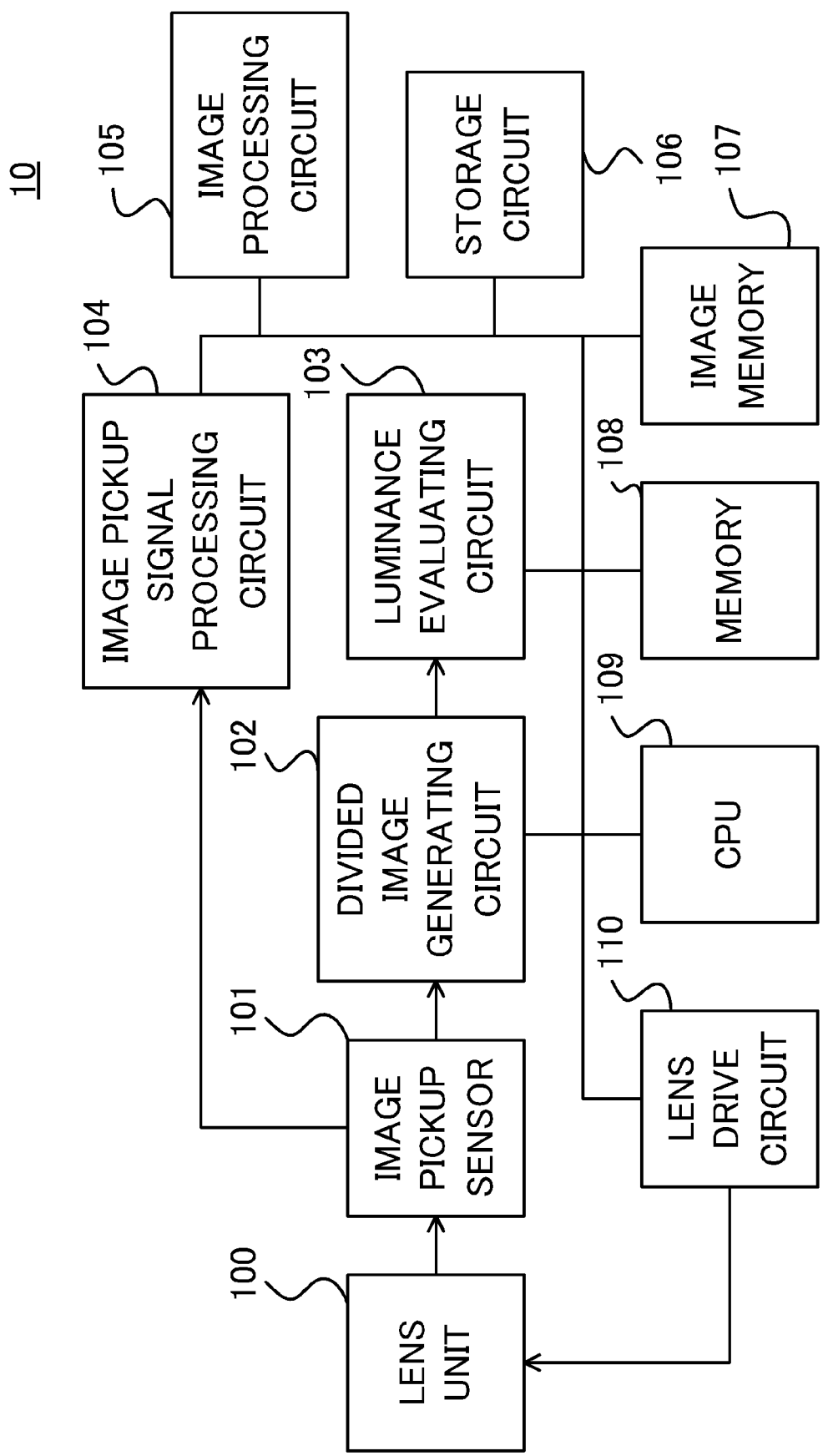
FIG. 1 is a block diagram of illustrating a configuration of an image pickup apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, referring to FIG. 1, a configuration of an image pickup apparatus including a focus detection apparatus in Embodiment 1 of the present invention will be described. FIG. 1 is a block diagram of illustrating a configuration of the image pickup apparatus 10 (a camera system) in the present embodiment. The image pickup apparatus 10 includes a focus detection apparatus which performs focus detection of a phase difference method by using an image pickup element including a plurality of pixels forming pairs of pixels (the first pixel, the second pixel), and the pixels of each pair share one micro lens. The focus detection apparatus of the present embodiment is applied to an image pickup system including an image pickup apparatus (an image pickup apparatus main body) which is configured to obtain an optical image obtained via an image pickup optical system and a lens unit (an image pickup optical system) removably mounted on the image pickup apparatus main body. However, the present embodiment is not limited to this, and the focus detection apparatus of the present embodiment can also be applied to an image pickup apparatus which is integrally provided with a lens unit.

In FIG. 1, reference numeral 100 denotes a lens unit (an image pickup optical system) which includes a focus lens, a zoom lens, an aperture stop, and the like. Reference numeral 101 denotes an image pickup sensor (an image pickup element) which performs photoelectric conversion for an object image (an optical image) obtained via the lens unit 100, which includes a CCD sensor or a CMOS sensor, for example. As described below, the image pickup sensor 101 includes a plurality of pixels forming pairs of pixels (the first pixel and the second pixel), and the pixels of each pair share one micro lens. Reference numeral 102 denotes a divided image generating circuit (a right and left images generating circuit). The divided image generating circuit 102 (a generating portion) generates two divided images based on output signals from the image pickup sensor 101. Specifically, as described below, the divided image generating circuit 102 generates a first luminance signal and a second luminance signal by using a signal obtained from each of the first pixel and the second pixel independently of each other. Reference numeral 103 denotes a luminance evaluating circuit. The luminance evaluating circuit 103 evaluates luminance of the two images based on the output signals from the divided image generating circuit 102. The luminance evaluating circuit 103 is an estimating unit (an estimating portion) which estimates a moving charge amount between the first pixel (a first photoelectric conversion element) and the second pixel (a second photoelectric conversion element) by using the first luminance signal and the second luminance signal, as described below.

Reference numeral 104 denotes an image pickup signal processing circuit. The image pickup signal processing circuit 104 obtains an output signal from the image pickup sensor 101 as an image pickup signal, and the image pickup signal processing circuit 104 performs a plurality of noise processing and the like for the image pickup signal. Reference numeral 105 denotes an image processing circuit (an image processor). The image processing circuit 105 performs various types of image processing for the output signal (the image signal) output from the image pickup signal processing circuit 104. As described below, the image pickup signal processing circuit 104 and the image processing circuit 105 perform processing for an image signal obtained by using an added signal of the first pixel and the second pixel. Reference numeral 106 denotes a storage circuit that stores an image in a removable storage medium (not shown). Reference numeral 107 denotes an image memory that stores an image.

Reference numeral 109 denotes a CPU, which performs various kinds of controls, a focus calculation (a correlation calculation), and a lens drive control in the image pickup apparatus 10. The CPU 109 includes a correcting unit (a correcting portion) which corrects the first luminance signal and the second luminance signal based on an estimation result obtained in the luminance evaluating circuit 103 (the estimating unit). The CPU 109 further includes a processor which performs a correlation calculation, i.e. a defocus amount calculating unit (a defocus amount calculator) which obtains a defocus amount, by using a correction value of the first luminance signal and the second luminance signal. by using a correction value of the first luminance signal and the second luminance signal. In addition, the CPU 109 includes a focus detecting unit (a focus detector) which performs focus detection of the phase difference method. Reference numeral 108 denotes a memory that stores a program which operates in the CPU 109 and data used in the program. Reference numeral 110 denotes a lens drive circuit which drives the focus lens, the aperture stop, or the like, of the lens unit 100.

Figure 2:
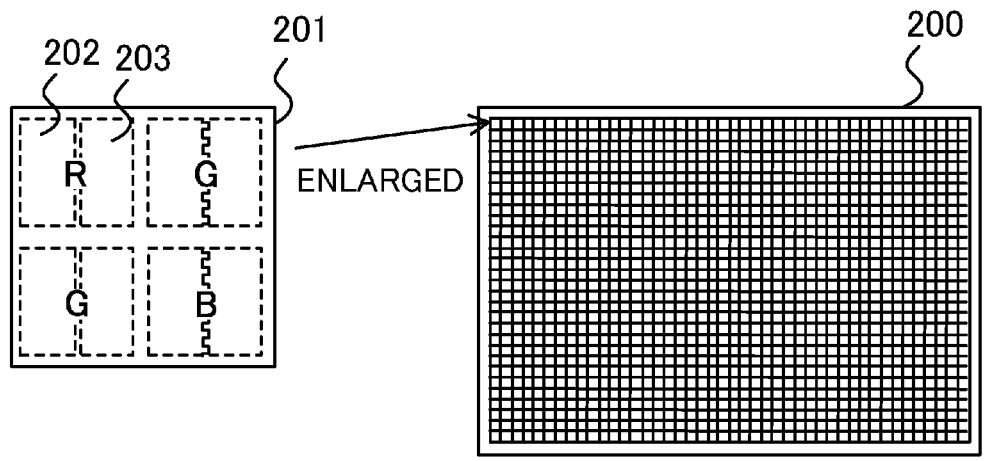
FIG. 2 is a schematic configuration diagram of an image pickup sensor in Embodiment 1.

FIG. 2 is a schematic configuration diagram of the image pickup sensor 101 in the present embodiment. In FIG. 2, reference numeral 201 denotes an enlarged block of a portion cut out from an entirety 200 of the image pickup sensor 101. In the block 201, each of red (R), green (G) and blue (B) pixels constitutes the Bayer array. In the block 201, each of the R, G and B pixels is divided in two sections, and the sections share one micro lens. That is, the image pickup sensor 101 includes two pixels (the first pixel and the second pixel) sharing one micro lens for each of the R, G and B. For example, the R pixel in the block 201 is divided into two sections, the two sections constitute an A-image pixel 202 (the first pixel, or the first photoelectric conversion element) and a B-image pixel 203 (the second pixel, Or the second photoelectric conversion element). Hereinafter, images (pixel values) output from an A-image pixel 202 and a B-image pixel 203 are referred to as an A-image and a B-image (an A-image pixel value and a B-image pixel value), respectively. If one of an A-image pixel 202 and a B-image pixel 201 receives a light amount equal to or greater than a predetermined amount so that a predetermined amount of charge or more is accumulated in the one of the pixels, the image pickup sensor 101 of the present embodiment can move (transfer) at least a part of the accumulated charge to the other pixel.

When an A-image and a B-image obtained from the image pickup sensor 101 are output to the image pickup signal processing circuit 104, the A-image and the B-image are added after A/D conversion is performed for them by an A/D converter (not shown) to obtain an added pixel value of the A-image pixel value and the B-image pixel value. The image pickup signal processing circuit 104 handles the added pixel value as a normal output from one pixel (an image signal). After a predetermined signal processing is performed for a shot image (the image signal) in the image pickup signal processing circuit 104, the shot image is converted into a predetermined format by the image processing circuit 105. Then, the shot image is stored in a storage medium by the storage circuit 106.

Figure 3:
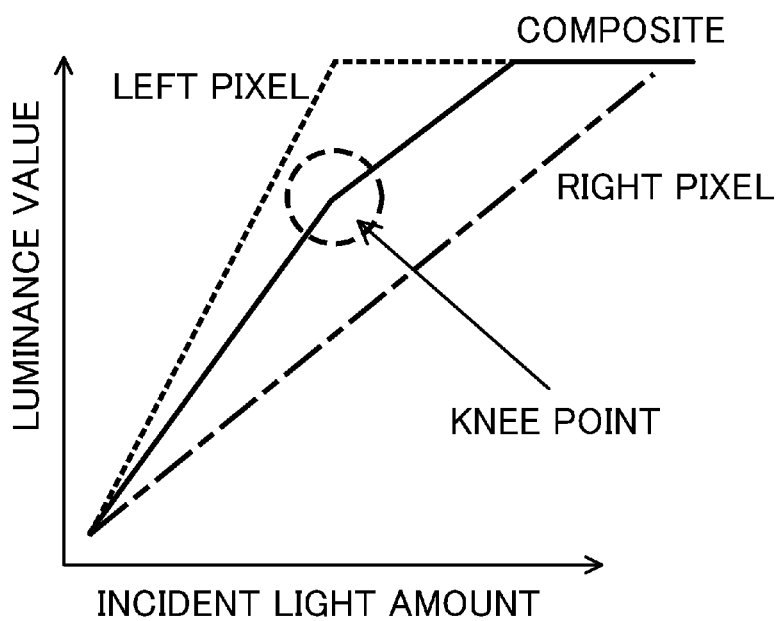
FIG. 3 is a diagram of describing a knee point in Embodiment 1.

In a case where outputs with respect to amounts of light (sensitivity with respect to amounts of light) received by two pixels, which are a right pixel and a left pixel, differ, a knee point is observed as illustrated in FIG. 3. FIG. 3 is a diagram of describing the knee point, and the vertical axis indicates a luminance value and the horizontal axis indicates an incident light amount. In FIG. 3, the dotted line indicates a luminance value (an output value) with respect to an incident light amount to a left pixel, the dashed-dotted line indicates a luminance value with respect to an incident light amount to a right pixel and the solid line indicates an added value (a composite value) of the luminance values of the left and right pixels. FIG. 3 illustrates a case where sensitivity of the left pixel is greater than the right pixel and where the left pixel is saturated prior to the right pixel.

In a case where neither the left pixel nor the right pixel is saturated, an average value of them is output as a sum of the left and right pixels, and the change (an inclination) of the luminance value with respect to the incident light amount is constant. However, if the left pixel is saturated, the composite value indicates the property of the right pixel (the inclination) and such inclination differs from the inclination of the left pixel before being saturated. In this case, linearity with respect to the incident light amount is lost and the image quality is deteriorated. In view of this, if the charge is accumulated even after the incident light amount exceeds a predetermined amount in either of the left and right pixels (when getting close to being saturated), the charge is moved (transferred) to one pixel from the other pixel which share one micro lens to reduce such influences.

On the other hand, when the A-image and the B-image obtained in the image pickup sensor 101 are output to the divided image generating circuit 102, they are output individually (independently) as they are. The divided image generating circuit 102 handles the A-image and the B-image as two image signals which are independent of each other. The divided image generating circuit 102 converts the two image signals (the A-image and the B-image) which are independently input into luminance values and outputs the luminance values to the luminance evaluating circuit 103. With respect to the A-image, the divided image generating circuit 102 adds A-images of red pixels (R pixels), green pixels (G pixels) and blue pixels (B pixels) in accordance with the unit of the Bayer array to obtain a luminance Y of the A-image. Similarly, with respect to the B-image, B-images of red pixels (R pixels), green pixels (G pixels) and blue pixels (B pixels) are added to obtain a luminance Y of the B-image. Here, a luminance signal array of the A-images arranged on a sensor surface of the image pickup sensor 101 in the order of reading out in the horizontal direction is called an A-image array (A-image signals) and a luminance signal array of B-images arranged on the sensor surface of the image pickup sensor 101 in the order of reading out in the horizontal direction is called a B-image array (B-image signals). Luminance signal arrays of the two images (A-image signals and B-image signals) generated as described above are input to the luminance evaluating circuit 103 and are sequentially stored in the memory 108.

Figure 5:
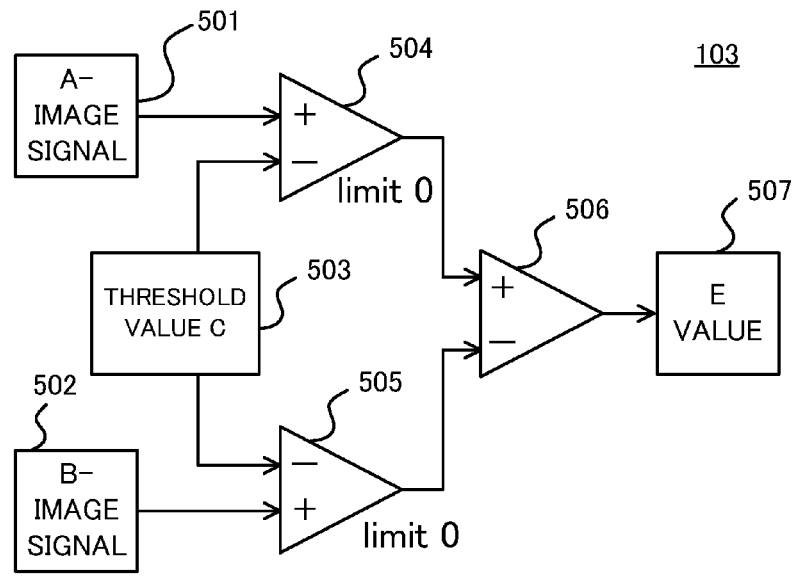
FIG. 5 is a block diagram of illustrating a configuration of a luminance evaluating circuit in Embodiment 1.

FIG. 5 is a block diagram of illustrating a configuration of the luminance evaluating circuit 103 (the estimating unit). The A-image signal (the first luminance signal) and the B-image signal (the second luminance signal) which are luminance values of the two images are sequentially input to the input units 501 and 502, respectively. A difference circuit 504 (a first comparing unit or a first comparator) compares the A-image signal with a predetermined threshold value C which is previously stored in the storage portion 503 and calculates the difference between them. A difference circuit 505 (a second comparing unit or a second comparator) compares the B-image signal with the predetermined threshold value C which is previously stored in the storage portion 503 and calculates the difference between them. Outputs from the difference circuits 504 and 505 are output with the lower limit of 0.

For example, the predetermined threshold value C is set to a level that triggers starting of a charge movement between the A-image pixel and the B-image pixel (crossing between A and B). As a result, the output from the difference circuit 504 is a component approximately corresponding to an energy (a charge amount) that flows out to the B-image from the A-image. Here, the meaning of approximately corresponding includes not only the cases of strictly corresponding (matching) but also includes the cases where evaluated as substantially corresponding (matching). Similarly, the output from the difference circuit 505 is a component approximately corresponding to an energy (a charge amount) that flows out to the A-image from the B-image. If neither the A-image signal nor the B-image signal exceeds the predetermined threshold value C, the energy does not be negative. Therefore, a value of 0 is set as the lower limit value.

The outputs from the difference circuits 504 and 505 are input to a difference circuit 506. The difference circuit 506 (a third comparing unit or a third comparator) calculates an energy (an E value) which represents information relating to a moving direction (a crossing direction) of the charge, i.e. information depending on a moving charge amount, based on the output signals from the difference circuits 504 and 505, and the difference circuit 506 outputs the E value (an energy value) to an output portion 507. That is, the difference circuit 506 compares a result obtained in the first comparing unit with a result obtained in the second comparing unit, and the information depending on the moving charge amount is output. The E values form an E value array because they are also sequentially input in accordance with the arrays of the A-image signals and the B-image signals. The E value arrays are sequentially stored in the memory 108. Here, the moving charge amount is a charge amount that moves from one of the first pixel and the second pixel to the other of the first pixel and the second pixel as a charge amount accumulated in the one of the first pixel and the second pixel comes close to a saturated charge amount.

Next, the CPU 109 performs the calculation represented by the following Expressions (1) and (2) by using an A-image array, a B-image array and an E value array stored in the memory 108 so as to correct the A-image array A [i] and the B-image array B [i].

$$A[i]=A[i]+K\times E[i] \tag{1}$$

$$B[i]=B[i]-K\times E[i] \tag{2}$$

Here, symbol K is a proportionality coefficient, which can be calculated experimentally. Symbol i is an array number. An example of the calculation method will be described below. Thus, in the present embodiment, the CPU 109 as the correcting unit corrects the first luminance signal and the second luminance signal by using a linear model. More specifically, the CPU 109 corrects the first luminance signal and the second luminance signal by adding or subtracting a value obtained by multiplying a predetermined coefficient by the information depending on the moving charge amount to or from the first luminance signal and the second luminance signal, respectively. Then, the CPU 109 performs a predetermined correlation calculation by using the A-image array and the B-image array corrected by Expressions (1) and (2) described above so as to perform focus detection by obtaining a phase difference.

Next, referring to FIGS. 4 and 6, a correction method (a focus detection method) in the present embodiment will be described. The focus detection method of the present embodiment is performed based on an instruction of the CPU 109.

Figure 4:
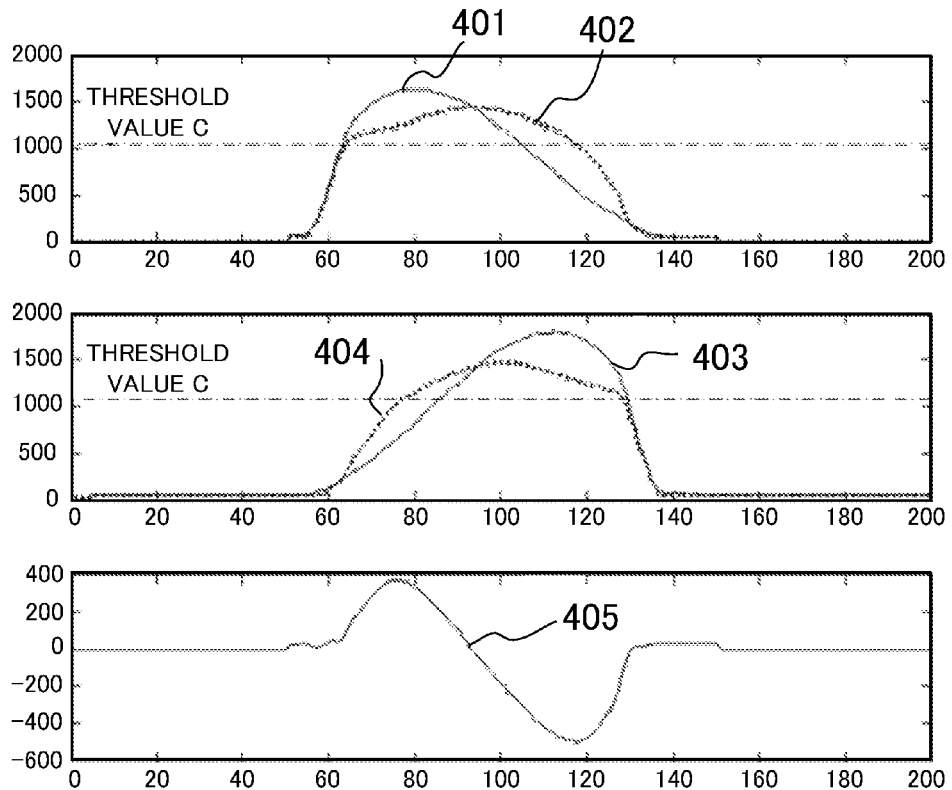
FIG. 4 is a waveform diagram of two images in bar-charts during defocusing in Embodiment 1.

FIG. 4 illustrates a waveform diagram of two images in bar-charts when defocusing is performed, and the vertical axis indicates a signal value and the horizontal axis indicates a pixel position. In FIG. 4, the waveforms 402 and 404 are outputs (the A-image signal and the B-image signal) from the image pickup sensor 101, which illustrate the A-image array and the B-image array (luminance signals) obtained by taking an image of a bar with high luminance. The waveforms 401 and 403 are outputs (an A-image array and a B-image array with no crossing between A and B) that are to be obtained when there is no crossing between A and B (a charge movement between the A-image pixel and the B-image pixel). The waveform 405 is a difference between the waveform 401 and the waveform 402, which indicates a correction amount (a correction value of the luminance signal) in a case where the waveform 402 is obtained.

Figure 6:
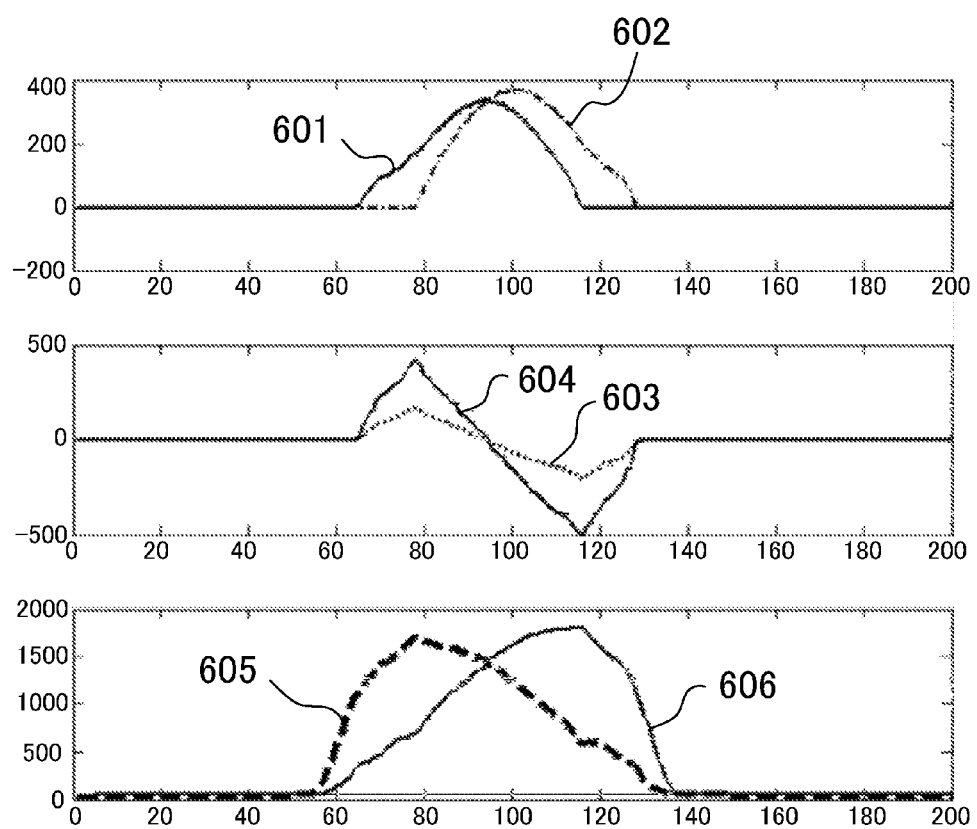
FIG. 6 is a waveform diagram of describing a correction method in Embodiment 1.

FIG. 6 illustrates waveform diagram of describing a correcting method (a focus detection method) in the present embodiment, and the vertical axis indicates a signal value and the horizontal axis indicates a pixel position. A waveform 601 is a difference between the A-image signal (the waveform 402) and the threshold value C, which indicates an output from the difference circuit 504. A waveform 602 is a difference between the B-image signal (the waveform 404) and the threshold value C, which indicates an output from the difference circuit 505. A waveform 603 is a difference between the waveform 601 and the waveform 602, which indicates an output from the difference circuit 506, i.e. the E value array.

By using the E value array which is indicated as the waveform 603 to obtain a correction value of the waveform 405 illustrated in FIG. 4, the waveform obtained with crossing between A and B can be returned (restored) to an original waveform. In order to return the waveform to the original waveform, a lot of non-linear processing need to be performed. However, in order to correct a position at the gravity center, it is sufficient to use a simple linear model represented by Expressions (1) and (2) described above. In the present embodiment, for example, by multiplying the waveform 602 by 2.5, i.e. setting the proportionality coefficient K with respect to the waveform 603 to 2.5 (K=2.5), the waveform 604 is obtained. The waveforms 605 and 606 are waveforms (corrected A-image signal and B-image signal) which are obtained by correcting the original waveforms 402 and 404 (the A-image signal and the B-image signal) by using the waveform 604. The focus detection result obtained by performing a correlation calculation using the waveforms 605 and 606 is approximately the same as the focus detection result obtained by performing a correlation calculation using the waveforms 401 and 403 in FIG. 4. Thus, according to the present embodiment, a prominent correction effect can be obtained by using a simple linear model.

Figure 8:
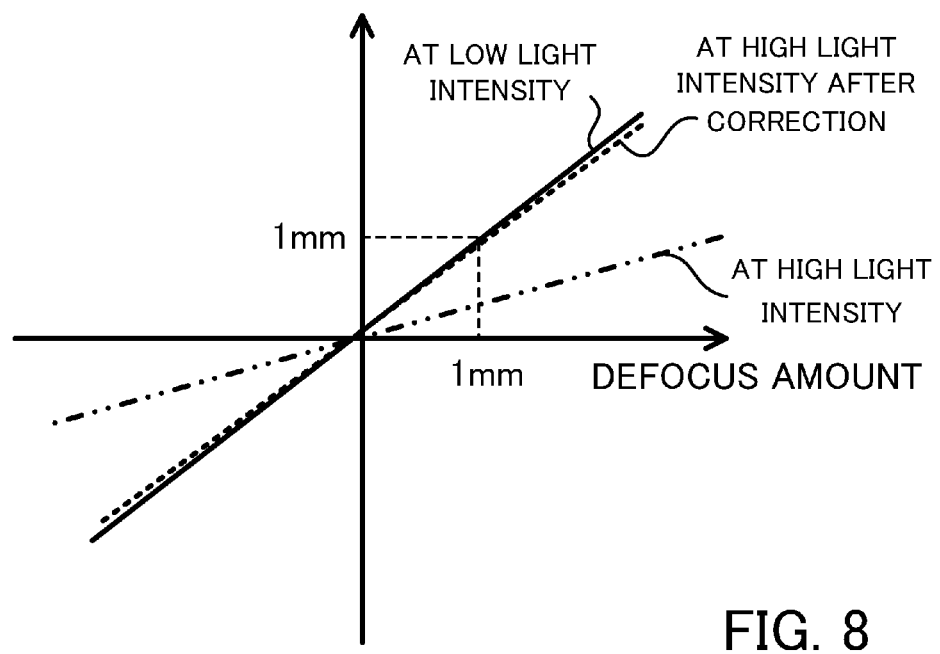
FIG. 8 is a graph of illustrating a focus detection result in Embodiment 1.

FIG. 8 is a graph of illustrating the focus detection result in the present embodiment, which illustrates the comparison between a result before the correction and a result after the correction. In FIG. 8, the horizontal axis indicates a defocus amount of an object and the vertical axis indicates the focus detection result. Because the crossing between A and B does not occur at low light intensity, a substantially accurate defocus amount can be detected (a solid line). On the other hand, because the crossing between A and B occurs at high light intensity, an error occurs in the distance measurement result (the focus detection result) in the direction where the phase difference (the defocus amount) becomes small (a dashed-two dotted line). The amounts of changes in inclinations of the two graphs depend on light intensity (an amount of the crossing between A and B, or a moving charge amount). By performing the correction of the present embodiment, the focus detection result which is approximately equivalent to that at low light intensity can be obtained at high light intensity (a dotted line).

Embodiment 2

Next, a focus detection method in Embodiment 2 of the present invention will be described. The focus detection method (the correction method) of Embodiment 1 is achieved as a linear model by combining software processing performed by hardware and the CPU 109. In order to perform a more accurate correction, as described above, the waveform 405 (the correction value of the luminance signal) of FIG. 4 needs to be obtained by using the E value array.

Figure 7:
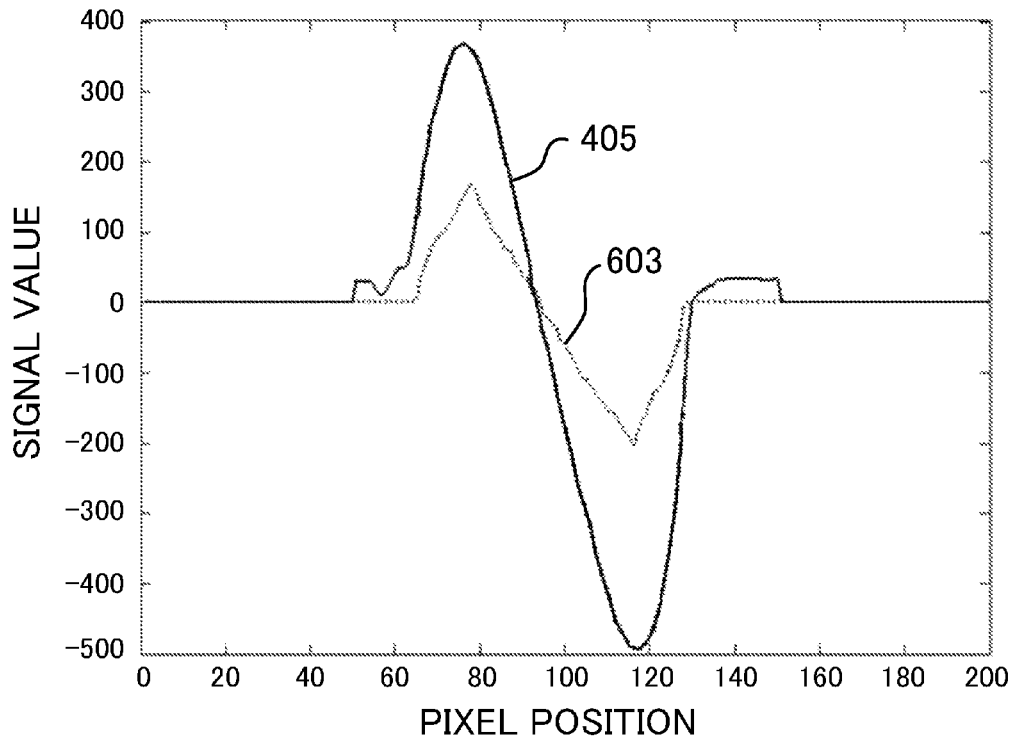
FIG. 7 is a waveform diagram of describing a correction method in Embodiment 2.

FIG. 7 is a waveform diagram of describing a correction method in the present embodiment, which illustrates the waveform 405 of FIG. 4 and the waveform 603 of FIG. 6 so as to overlap with each other. In order to perform a more rigorous correction compared to Embodiment 1, two factors need to be considered. One factor is to perform processing equivalent to the processing of Embodiment 1 independently with respect to the pixel signal (the A-image signal and the B-image signal) from each of the R pixel, the G pixel, and the B pixel, and then, the luminance signal (a Y signal) is generated. The other factor is a loss term that occurs during the charge movement.

When obtaining the correction value independently with respect to the pixel signal from each of the R pixel, the G pixel, and the B pixel, the correcting method of Embodiment 1 need to be performed independently for the pixel of each color. For example, the CPU 109 (the estimating unit) uses the pixel signal of each color obtained independently from the first pixel and the second pixel to estimate the moving charge amount between the first pixel and the second pixel. The CPU 109 (the estimating unit) further corrects the pixel signal of each color based on the estimation result obtained in the estimating unit. The divided image generating circuit 102 (the generating portion) uses the correction value of the pixel signal of each color to generate the first luminance signal with respect to the first pixel and the second luminance signal with respect to the second pixel. Then, the CPU 109 (a processor) uses the first luminance signal and the second luminance signal to perform a correlation calculation.

The loss term can be obtained experimentally in a simple manner. In FIG. 4, the waveform 405 is the difference between the waveform 401 and the waveform 402. Similarly, by obtaining the difference between the waveform 403 and the waveform 404, a waveform of a correction amount for the B-image signal can be calculated (not shown). Further, by adding the waveform 405 which is the A-image signal after the correction and the waveform of the B-image signal after the correction, a waveform of a loss amount is obtained (0 is obtained if there is no loss). In the present embodiment, as an amount that depends on the configuration of the image pickup sensor 101, a predetermined offset amount N is used. Therefore, in the present embodiment, a correction can be performed as represented by the following expressions (3) and (4).

$$Ar[i]=Ar[i]+Kr\times Er[i]-N \quad (3\text{-}1)$$

$$Ab[i]=Ab[i]+Kb\times Er[i]-N \quad (3\text{-}2)$$

$$Ag[i]=Ag[i]+Kg\times Er[i]-N \quad (3\text{-}3)$$

$$A[i]=Ar[i]+Ag[i]+Ab[i] \quad (3\text{-}4)$$

$$Br[i]=Br[i]+Kr\times Br[i]+N \quad (4\text{-}1)$$

$$Bb[i]=Bb[i]+Kb\times Bb[i]+N \quad (4\text{-}2)$$

$$Bg[i]=Bg[i]+Kg\times Bg[i]+N \quad (4\text{-}3)$$

$$B[i]=Br[i]+Bg[i]+Bb[i] \quad (4\text{-}4)$$

In each expression, r, b, and g indicate the colors of the R pixel, the B pixel, and the B pixel, respectively. Thus, in the present embodiment, by taking a non-linear component into consideration (by correcting the pixel signal of each color by using a non-linear model), a highly-accurate correction can be performed and therefore an accuracy in the focus detection can be improved. In this case, furthermore, it is preferred that the pixel signal for each color is corrected by using the offset amount which depends on the image pickup sensor 101.

According to each of the embodiments described above, an error in a distance measurement (an error in focus detection) can be reduced even with an object such as a high luminance object or an image pickup condition with high light intensity, and the deterioration in focusing accuracy and focusing speed can be avoided. Therefore, a focus detection apparatus, an image pickup apparatus, and a focus detection method capable of reducing a focus detection error in a case where an incident light amount is large (at a high luminance) can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-257035, filed on Nov. 26, 2012, which is hereby incorporated by reference herein in its entirety.

What is claimed is:

1. A focus detection apparatus comprising:
an image pickup element including a first pixel and a second pixel configured to detect light beams passing through different exit pupils in an image pickup optical system;
a luminance evaluating circuit configured to estimate a moving charge amount between the first pixel and the second pixel by using a first luminance signal obtained in the first pixel and a second luminance signal obtained in the second pixel;
one or more processors for implementing a correcting unit, a defocus amount calculating unit and a focus detecting unit, wherein:
the correcting unit is configured to correct the first luminance signal and the second luminance signal based on an estimation result obtained in the luminance evaluating circuit;
the defocus amount calculating unit is configured to obtain a defocus amount based on a first correction value of the corrected first luminance signal and a second correction value of the corrected second luminance signal; and
the focus detecting unit is configured to perform focus detection of a phase difference method based on the defocus amount obtained by the defocus amount calculating unit,
wherein the moving charge amount is a charge amount which moves from one of the first pixel and the second pixel to the other of the first pixel and the second pixel as a charge amount accumulated in the one of the first pixel and the second pixel comes close to a saturated charge amount.

2. The focus detection apparatus according to claim 1, wherein the luminance evaluating circuit comprises:
a first comparing unit configured to compare the first luminance signal with a predetermined threshold value;
a second comparing unit configured to compare the second luminance signal with the predetermined threshold value; and
a third comparing unit configured to compare a result obtained in the first comparing unit with a result obtained in the second comparing unit so as to output information depending on the moving charge amount.

3. The focus detection apparatus according to claim 1, wherein the correcting unit corrects the first luminance signal and the second luminance signal by using a linear model.

4. The focus detection apparatus according to claim 1, wherein the correcting unit corrects the first luminance signal and the second luminance signal by adding or subtracting a value obtained by multiplying information depending on the moving charge amount by a predetermined coefficient to or from the first luminance signal and the second luminance signal, respectively.

5. The focus detection apparatus according to claim 1,
wherein the luminance evaluating circuit estimates the moving charge amount between the first pixel and the second pixel by using the first luminance signal obtained in the first pixel and the second luminance signal obtained in the second pixel for each color, and
wherein the correcting unit corrects the first luminance signal and the second luminance signal based on an estimation result obtained in the luminance evaluating circuit for each color.

6. The focus detection apparatus according to claim 1, wherein the correcting unit corrects a pixel signal of each color by using a non-linear model.

7. The focus detection apparatus according to claim 1, wherein the correcting unit corrects the first luminance signal and the second luminance signal of each color by using an offset amount which depends on the image pickup element.

8. An image pickup apparatus comprising the focus detection apparatus according to claim 1.

9. A focus detection method of performing focus detection of a phase difference method by using an image pickup element including a first pixel and a second pixel configured to detect light beams passing through different exit pupils in an image pickup optical system, the focus detection method comprising the steps of:
estimating a moving charge amount between the first pixel and the second pixel by using a first luminance signal obtained in the first pixel and a second luminance signal obtained in the second pixel;
correcting the first luminance signal and the second luminance signal based on an estimation result obtained in the estimating step;
obtaining a defocus amount based on a first correction value of the corrected first luminance signal and a second correction value of the corrected second luminance signal; and
performing the focus detection of the phase difference method based on the defocus amount obtained in the obtaining step,
wherein the moving charge amount is a charge amount which moves from one of the first pixel and the second pixel to the other of the first pixel and the second pixel as a charge amount accumulated in the one of the first pixel and the second pixel comes close to a saturated charge amount.

* * * * *